United States Patent Office 3,274,112
Patented Sept. 20, 1966

3,274,112
ANTICORROSION AND ANTIFREEZE COMPOSITIONS CONTAINING AN ALKALI METAL SALT OF 2,3-DIHYDRO-1,4-DITHIIN-5,6-DICARBOXYLIC ACID
Dale C. Blomstrom, Wilmington, Del., assignor to E. I. du Pont de Nemours and Company, Wilmington, Del., a corporation of Delaware
No Drawing. Filed Apr. 12, 1963, Ser. No. 272,546
4 Claims. (Cl. 252—78)

This application is a continuation-in-part of my copending application Serial No. 67,160, filed November 4, 1960, and now abandoned.

This invention relates to, and has as its principal objects provision of, compositions of matter effective to prevent or retard the corrosion of metals and the employment of the compositions.

In accordance with this invention, the corrosion of metal surfaces under the influence of water is prevented or substantially retarded by adding to the water with which the metal is in contact an effective amount of a novel alkali metal salt of 2,3-dihydro-1,4-dithiin-5,6-dicarboxylic acid. The invention also comprises liquid, aqueous compositions containing, in amounts effective to retard the corrosion of metal surfaces, an alkali metal salt of 2,3-dihydro-1,4-dithiin-5,6-dicarboxylic acid. In an important embodiment of the invention, the said compositions also comprise, in effective amounts, an agent which depresses the freezing point of water, and are thus suitable for use as antifreeze compositions, for example, in the cooling system of an internal combustion engine.

The alkali metal salts of 2,3-dihydro-1,4-dithiin-5,6-dicarboxylic acids, which have the formula

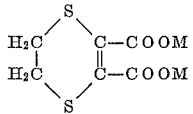

where M is an alkali metal cation, preferably sodium or potassium, are prepared by alkaline hydrolysis of 2,3-dihydro-1,4-dithiin-5,6-dicarboxylic anhydride,

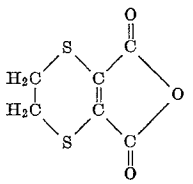

They can also be prepared by alkaline hydrolysis of 5,6-dicyano-2,3-dihydro-1,4-dithiin,

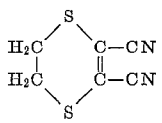

This hydrolysis, which in either case is rapid at moderately elevated temperatures, in the range of 50–100° C., also takes place at a substantial rate at ordinary temperatures. For this reason, the antifreeze compositions of this invention need not necessarily be made from the preformed salt. They can instead be prepared by mixing 2,3-dihydro-1,4-dithiin-5,6-dicarboxylic anhydride, or 5,6-dicyano-2,3-dihydro-1,4-dithiin, with an aqueous solution of a hydroxide or weak acid salt (e.g., carbonate, borate, metaborate) of an alkali metal, whereby hydrolysis takes place in situ.

2,3-dihydro-1,4-dithiin - 5,6 - dicarboxylic anhydride is prepared from 5,6-dicyano-2,3 - dihydro - 1,4 - dithiin by acid hydrolysis, preferably with a strong, non-oxidizing inorganic acid, such as hydrochloric acid or sulfuric acid, the reaction being preferably carried out in the temperature range of 50–125° C. This reaction is an unusual one in that the anhydride is unexpectedly and surprisingly stable under acid hydrolysis conditions and resists conversion to the corresponding free acid. Similarly, acidification with a strong inorganic acid of an aqueous solution of an alkali metal 2,3-dihydro-1,4-dithiin-5,6-dicarboxylate does not give the free acid, as expected, but the anhydride.

Examples are given below of the preparation of anhydride and of the sodium salt. The starting material, 5,6-dicyano-2,3-dihydro-1,4-dithiin, can be prepared by reaction of a 1,2-dihaloethane with 1,2-dicyano-1,2-disodiothioethylene, as described, for example, in French Patent 1,205,227, U.S. Patent 3,058,991, or Agnew. Chem. 72, 963 (1960). The recrystallized product melts at 138–140° C.

EXAMPLE 1

A mixture of 2 g. of 5,6-dicyano-2,3-dihydro-1,4-dithiin and 50 ml. of concentrated hydrochloric acid was heated at reflux for 3 hours, then cooled. The reaction product, a mixture of yellow crystals and solidified oil, was filtered and washed with water. There was obtained 1.97 g. (88% yield) of a solid which after recrystallization from a methylene chloride/methylcyclohexane mixture gave golden leaflets melting at 107–108° C. This was shown by elemental and infrared analysis and molecular weight determination to consist essentially of 2,3-dihydro-1,4-dithii-5,6-dicarboxylic anhydride.

However, the product still contained a small amount of nitrogen, presumably due to the presence of some unreacted starting material. The pure product was obtained by dissolving 1 g. of the crude anhydride in 10 ml. of 5% aqueous sodium hydroxide and heating the solution for 2 hours at 100° C. There was thus formed, in solution, the sodium salt of 2,3-dihydro-1,4-dithiin-5,6-dicarboxylic acid which, on acidification, was converted to the anhydride rather than to the free acid. The purified, nitrogen-free 2,3-dihydro-1,4-dithiin - 5,6 - dicarboxylic anhydride which precipitated on acidification melted at 114–114.5° C. after recrystallization from diethyl ether.

*Analysis.*—Calcd. for $C_6H_4O_3S_2$: C, 38.33; H, 2.14. Found: C, 38.49; H, 2.32.

EXAMPLE 2

Sodium 2,3 - dihydro-1,4-dithiin-5,6-dicarboxylate was prepared by dissolving 0.5 g. of 2,3-dihydro-1,4-dithiin-5,6-dicarboxylic anhydride in 10 ml. of 5% aqueous sodium hydroxide at 100° C. The solution was evaporated under reduced pressure to a thick syrup which was stirred with a mixture of isopropyl alcohol and methyl alcohol. The resulting white solid was recrystallized from aqueous ethyl alcohol to give the purified salt.

*Analysis.*—Calc'd for $C_6H_4Na_2O_4S_2$: C, 28.82; H, 1.61. Found: C, 29.40; H, 1.94.

When the pH of an aqueous solution of this salt was brought down to 3 by addition of dilute hydrochloric acid, 2,3-dihydro-1,4-dithiin - 5,6 - dicarboxylic anhydride crystallized from the solution rather than the free dicarboxylic acid.

The potassium salt can be prepared in the same manner, using potassium hydroxide for the hydrolysis.

In the anticorrosive compositions of this invention, the liquid medium may consist solely of water, or it may consist of water in admixture with one or more organic liquids, which are preferably but not necessarily miscible with or soluble in water. The presence of an organic solvent may be desired for various reasons (for example, in antifreeze compositions) and it offers some advantage when the alkali metal dicarboxylate is to be prepared in situ from a precursor (the corresponding anhydride or dicyano compound) since it helps to solubilize the precursor and thus accelerates its hydrolysis. Suitable organic liquids include, for example, the lower alkanols, acetone, methyl ethyl ketone, dioxane, pyridine, aliphatic or aromatic hydrocarbons, etc. Weakly acidic materials can be used if their acid strength is relatively low (ionization constant less than about $1 \times 10^{-5}$). The liquid medium should contain sufficient water to keep the alkali metal 2,3-dihydro-1,4-dithiin-5,6-dicarboxylate in at least partial solution.

Appreciable anticorrosive effect is obtained when the agent of this invention is present in concentration as low as 0.02% by weight of the aqueous medium in which it is used. Better results are obtained when the concentration is 0.05% by weight or higher. There is no critical upper limit of concentration but it is unnecessary to exceed about 15%. Of course, more concentrated compositions can be prepared, for example for purposes of storage and shipping, and diluted prior to use.

Other materials can be present in these compositions for various purposes, such as surface-active agents, antioxidants, reducing agents, dyes, dispersed or dissolved resins, antifoaming agents, and the like, and other anticorrosion agents may be used if desired in addition to those of this invention.

Antifreeze compositions containing an alkali metal 2,3-dihydro-1,4-dithiin-5,6-dicarboxylate (or precursors thereof), with or without additional conventional anticorrosion agents, constitute an important embodiment of this invention. The antifreeze agent, i.e., freezing point depressant, used in such compositions can be any of the well known ones, such as methyl alcohol, ethyl alcohol, isopropyl alcohol, ethylene glycol, propylene glycol, butylene glycol, glycerol, glucose, sodium chloride, calcium chloride, magnesium chloride, etc. Of these agents, the preferred ones are the 1–3 carbon alkanols and the 2–4 carbon alkanediols. The antifreeze compositions may contain corrosion inhibitors of conventional types, which may be organic, e.g., sulfonated oils, soaps, organic amines, mercaptobenzothiazole, or inorganic, e.g., alkali metal borates, metaborates, nitrites, phosphates or chromates. Alkali metal salts of weak acids, such as sodium borate or metaborate, are sufficiently alkaline to hydrolyze 2,3-dihydro-1,4-dithiin-5,6-dicarboxylic anhydride or 5,6-dicyano-2,3-dihydro-1,4-dithiin to the corresponding alkali metal dicarboxylate even in the absence of additional alkali.

Any metal susceptible to corrosion by water and/or corrosive agents normally associated with water, such as oxygen and electrolytes, can be effectively protected by using the agents of this invention, even under severe conditions such as exist, for example, in the cooling system of an internal combustion engine. Such metals, or their alloys, include principally iron, steel, aluminum, magnesium, copper, zinc, tin, lead, brass, bronze and solder.

The following examples illustrate the anticorrosive and antifreeze aspects of the invention.

EXAMPLE 3

A strip of autobody steel, ½″ x 1/32″ x 2″, was partially immersed in 4 ml. of distilled water containing 0.4 g. of sodium 2,3-dihydro-1,4-dithiin-5,6-dicarboxylate in an open beaker for 5 days. At the end of that time, there was no trace of corrosion or discoloration of the steel. In comparison, a similar strip of the same steel partially immersed in distilled water turned black on the surface and gelatinous iron oxide formed in the water within 24 hours.

EXAMPLE 4

This example illustrates the use in an antifreeze composition of sodium 2,3-dihydro-1,4-dithiin-5,6-dicarboxylate, formed in situ on hydrolysis of the corresponding anhydride by the alkaline agent (sodium metaborate) present in the composition.

2,3-dihydro-1,4-dithiin-5,6-dicarboxylic anhydride was added at a concentration of 0.35% by weight to an antifreeze formulation containing, by weight, 95% of ethylene glycol, 2.8% of sodium metaborate, 2% of water, and 0.2% of mercaptobenzothiazole. This formulation was then dissolved in water at 15% and 33% concentration by volume and the corrosive effect of the resulting aqueous solutions on various metals was tested in accordance with the SAE beaker corrosion test. Control solutions containing the same amounts of the same formulation but without the anhydride, were similarly tested at the same time for comparative purposes. The table below shows the results, expressed as loss of metal weight in milligrams per square inch.

*Table*

| Anhydride Present | Antifreeze Concentration, percent | Metal Weight Losses, mg./sq. in. | | | | | |
|---|---|---|---|---|---|---|---|
| | | Aluminum | Copper | Brass | Solder | Steel | Cast Iron |
| No | 33 | 19.8 | 1.1 | 0.4 | 3.0 | 0.6 | 0.2 |
| Yes | 33 | 16.0 | 0.1 | 0.1 | 0.1 | 0.4 | 2.3 |
| No | 15 | 25.5 | 1.2 | 1.4 | 8.1 | 8.4 | 71.2 |
| Yes | 15 | 7.6 | 0.6 | 0.1 | 5.4 | 0.0 | 0.1 |

The results of the table show that sodium 2,3-dihydro-1,4-dithiin-5,6-dicarboxylate, formed in situ from the corresponding anhydride possesses outstanding corrosion inhibition properties when evaluated in this standard test, especially at the lower level of antifreeze concentration.

The corrosion inhibitors of this invention are useful in any application where metal surfaces come in contact with water. Thus, antifreeze compositions containing them can be used in internal combustion engine cooling systems, in pneumatically and hydraulically operated machinery such as air hammers, railroad switch mechanisms or hydraulic lifts, in deicing fluids for aircraft, etc. Other uses for these corrosion inhibitors include the protection of automatic and control instruments, of brine-circulating systems, etc.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of protecting a ferrous metal surface against corrosion by water which comprises continuously contacting the same with an aqueous liquid consisting essentially of an aqueous solution of at least 0.02 percent by weight, based on the weight of the liquid medium, of an alkali metal 2,3-dihydro-1,4-dithiin-5,6-dicarboxylate.

2. An antifreeze composition consisting essentially of water, an antifreeze agent selected from the group consisting of 1–3 carbon alkanols, 2–4 carbon alkanediols, glycerol and glucose, and at least 0.02% by weight, based on the weight of liquid, of an alkali metal 2,3-dihydro-1,4-dithiin-5,6-dicarboxylate, as an essential anticorrosion agent, in aqueous solution.

3. The antifreeze composition of claim 2 wherein the anticorrosion agent is present in the amount of 0.05–15% by weight, based on the weight of liquid.

4. A noncorrosive liquid composition consisting essentially of water, ethylene glycol, and at least 0.02% by weight, based on the weight of liquid medium, of an alkali metal 2,3-dihydro-1,4-dithiin-5,6-dicarboxylate, as an essential anticorrosion agent, in aqueous solution.

References Cited by the Examiner

UNITED STATES PATENTS

| | | | |
|---|---|---|---|
| 2,752,346 | 6/1956 | Rosch | 260—327 |
| 2,855,366 | 10/1959 | Manteuffel et al. | 252—78 |
| 2,891,072 | 6/1959 | Remes et al. | 260—327 |
| 2,923,716 | 2/1960 | Bossert | 260—327 |
| 2,976,247 | 3/1961 | Truitt | 252—78 |
| 2,991,292 | 7/1961 | Degener | 260—327 |
| 3,058,991 | 10/1962 | Wolf et al. | 260—327 |
| 3,073,844 | 1/1963 | Krespan | 252—406 XR |

LEON D. ROSDOL, *Primary Examiner.*

JULIUS GREENWALD, *Examiner.*

J. D. WELCH, *Assistant Examiner.*